J. TIETZ.
Plow.
No. 67,002.
Patented July 23, 1867.
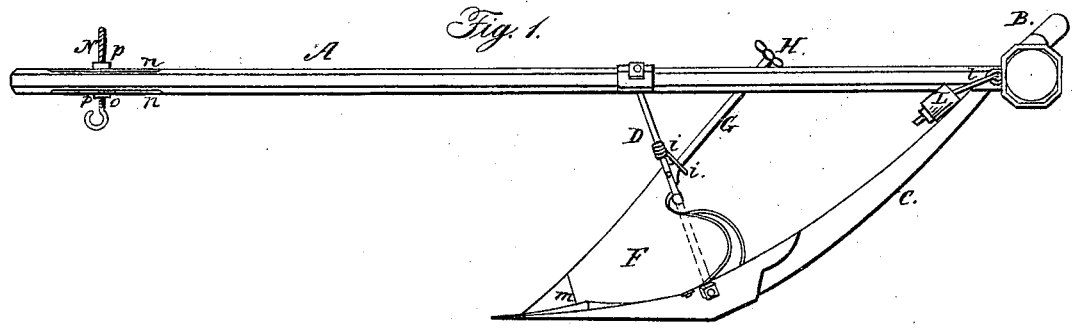
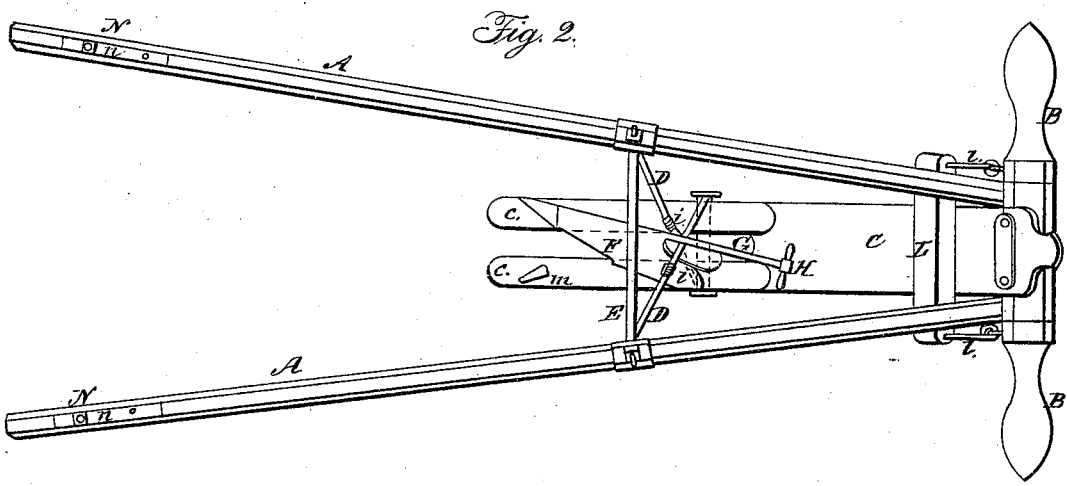
Witnesses:
Charles H. Pettet
John C. Rimon
Inventor:
John Tietz
By Munn & Co
Attorneys.

United States Patent Office.

JOHANN TIETZ, OF BALTIMORE, MARYLAND.

Letters Patent No. 67,002, dated July 23, 1867.

IMPROVEMENT IN PLOUGHS.

*The Schedule referred to in these Letters Patent and making part of the same.*

TO ALL WHOM IT MAY CONCERN:

Be it known that I, JOHANN TIETZ, of the city and county of Baltimore, and State of Maryland, have invented a new and useful Improvement in Ploughs; and I do hereby declare the following to be a full, clear, and exact description of the same, reference being had to the accompanying drawings, forming part of this specification, in which—

Figure 1 represents a side elevation of my invention.

Figure 2 shows a top view of the same.

Figure 3 shows the operation of my plough in a field.

Similar letters of reference indicate corresponding parts in the two figures.

In this invention a novel form of standard is introduced, and the mould-board is made adjustable, so as to throw the dirt on either side of the plough required. An adjustable clevis gives the proper depth of cut. In ploughing between rows of corn and other vegetables, it is often sufficient to throw the soil from one furrow alone towards each row. If the mould-board is fixed so as to throw the dirt on only one side of the plough, it will be necessary to go back and forth between the same rows, then to skip the space between the next two rows, then to go back and forth in the next space, &c., &c., alternately cutting a deep double furrow between some rows and none at all between others. To obviate this difficulty and enable the farmer to prepare his ground uniformly and distribute the dirt in the best manner to the vegetables, I have constructed my improved plough.

In order that others skilled in the art to which my invention appertains may be enabled to make and use the same, I will proceed to describe it in detail.

In the drawings, A represents the draw-beams, attached to the handles B. Fixed to the latter is the plough-standard C, terminating at the bottom in a bifurcated point, $c\ c$. Braces D D connect the standard with the draw-beams, and are assisted in strengthening the instrument by another brace, E, running from one draw-beam to the other. F is the mould-board, attached to an upright post, G, provided at its upper extremity with a handle, H. This mould-board is double, being, in fact, two mould-boards, formed to work in opposite directions, and connected together at their front edges, an angular space existing between them in rear of the line where they are connected. The post G is pivoted by some form of universal joint to the crossed braces D D, or to a rod connecting them. The pivot at which the post G is thus attached may be simply a chain, or it may be as shown in the drawings, a rod supported at its ends in holes in the braces, and passing through a hole in the post, in which case, to hold the post in an upright position, chains, ropes, or wires $i\ i$ may be employed, and may be attached to the post G and the braces D, in such manner as to have some degree of elasticity, yielding when the handle H is depressed forcibly, and returning the post G to its proper position when the force is removed from the handle. Little raised knobs or pins $m\ m$ are cast upon the upper side of the forked extremities of the standard, which fit into the recess at the bottom of the mould-board, and hold it in place. A chock, L, is placed across the standard and draw-beams in the angle which they form by meeting, and is confined to the cross-beam B, the ends of which form the plough-handles, by means of the rods $l\ l$. The standard and the plough-beams fit into gains on the side of the chock, so that all are held firmly in place. Clevises N N are provided at the forward end of the draw-beams, consisting of two plates $n\ n$, one on the under and one on the upper side of each draw-beam, with a vertical staple, $o\ o$, passing through them, and held in place by screws and nuts $p\ p$, the staples having a hook at their lower ends to receive the draught-chains. When the staples are screwed up into the beam so as to bring the draught-chain near it, the plough will take deeper into the soil; when unscrewed, the cut of the plough will be less in depth. The depth of the furrow may thus be regulated at pleasure. The distance between the knobs $m\ m$ and the lower part of the braces D D is such that when the bottom of the mould-board is stepped over either of the knobs the brace attached to the opposite fork of the standard enters between the two boards that compose the mould-board, and hold it firmly in place while the plough is cutting through the soil. As the mould-board may be stepped upon either knob $m\ m$, it follows that the direction in which it will throw the dirt may be changed at pleasure.

With a plough thus constructed, anybody can plough once between two rows X and Z, throwing the dirt upon the row Z; then, in returning, reverse the mould-board, and the dirt will be thrown upon the next row W; then, again advancing, the dirt will be thrown to the next adjoining row V, and so on, obliging the farmer to plough but one way between any two rows, by which means a great saving of time and labor is effected and the field is ploughed uniformly.

Having thus described my invention, what I claim as new, and desire to secure by Letters Patent, is—

1. The forked plough-standard C, as and for the purpose described.

2. The reversible mould-board F, in combination with the standard C and the braces D D, substantially as and for the purpose specified.

3. The adjustable clevis N, substantially as and for the purpose described.

To the above specification of my improvement I have signed my hand this tenth day of June, 1867.

JOHANN TIETZ.

Witnesses:
NATHAN K. ELLSWORTH,
CHARLES A. PETTIT.